July 25, 1967  A. B. FLY ET AL  3,332,496

FRACTURING APPARATUSES

Original Filed March 3, 1961  8 Sheets-Sheet 1

INVENTORS
A. B. FLY & W. D. MCDEARMAN JR
BY
Ely Silverman
ATTORNEY

July 25, 1967 A. B. FLY ET AL 3,332,496
FRACTURING APPARATUSES
Original Filed March 3, 1961 8 Sheets-Sheet 2

INVENTORS
A. B. FLY & W. D. MCDEARMAN, JR
BY
Ely Silverman
ATTORNEY

INVENTORS
A. B. FLY & W. D. MCDEARMAN, JR
BY
ATTORNEY

July 25, 1967 A. B. FLY ET AL 3,332,496
FRACTURING APPARATUSES
Original Filed March 3, 1961 8 Sheets-Sheet 5

INVENTORS.
A. B. FLY & W. D. MCDEARMAN, JR.
BY
Ely Silverman
ATTORNEY

July 25, 1967 A. B. FLY ET AL 3,332,496
FRACTURING APPARATUSES
Original Filed March 3, 1961 8 Sheets-Sheet 6

INVENTORS
A. B. FLY & W. D. MCDEARMAN, JR
BY
*Ely Silverman*
ATTORNEY

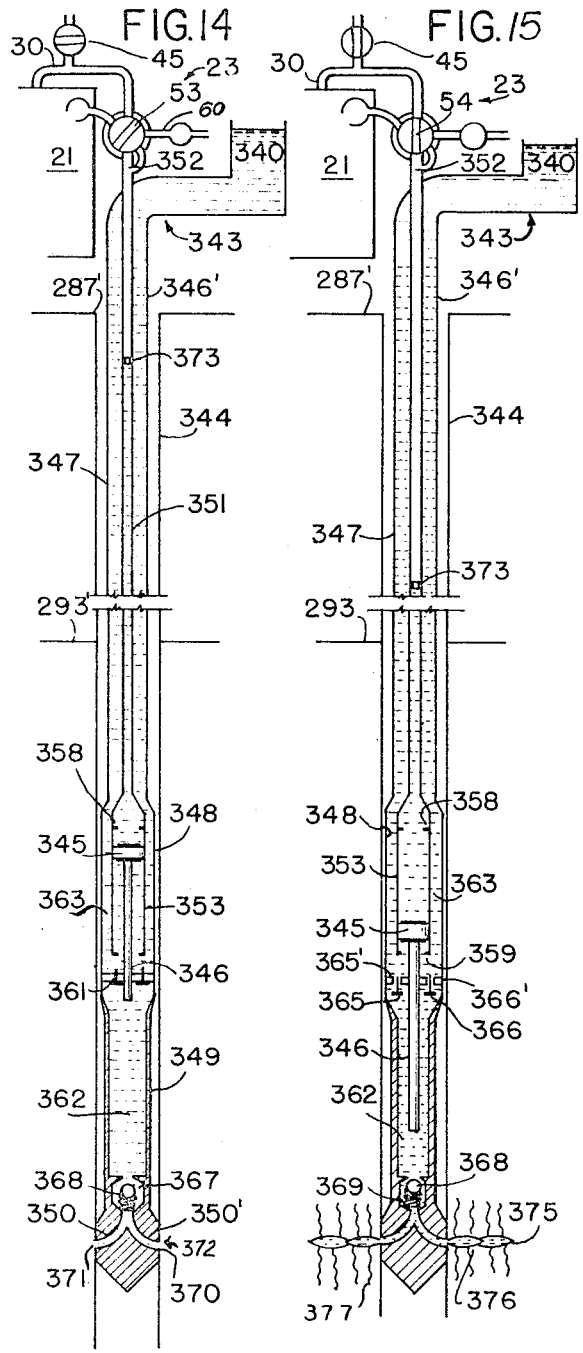

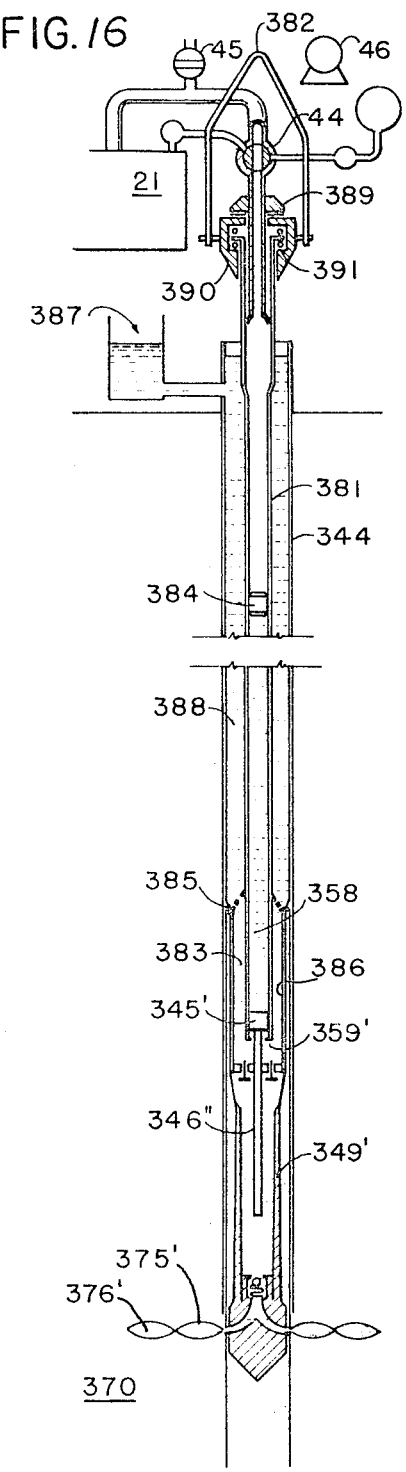

United States Patent Office 3,332,496
Patented July 25, 1967

3,332,496
FRACTURING APPARATUSES
Anderson Billy Fly and William David McDearman, Jr., Amarillo, Tex., assignors to Hydro-Torq Pump Company, Inc., Amarillo, Tex., a corporation of Texas
Original application Mar. 3, 1961, Ser. No. 93,110, now Patent No. 3,202,108, dated Aug. 24, 1965. Divided and this application Aug. 19, 1965, Ser. No. 480,912
3 Claims. (Cl. 166—177)

This application is a division of our co-pending patent application Ser. No. 93,110, filed Mar. 3, 1961, now U.S. Patent 3,202,108, issued Aug. 24, 1965.

This invention relates to a new and useful method and apparatus for fracturing a well.

One object of this invention is to provide an improved method for fracturing a well.

Another object of the invention is to provide improved apparatuses for fracturing a well.

Other objects and advantages of the methods and apparatuses of this invention will be apparent to those skilled in the art.

Generally, according to this invention there are provided method and apparatuses for pumping liquids at high pressure and power outputs with minimum of total moving parts and a minimum of components—only two valves per cylinder in one embodiment—exposed to abrasive fluid action. Pumping units acording to this invention may be built in units capable of very great pressure and power outputs with thermal efficiencies equal or greater than diesel units of the same power output. Further, the operation of the method and apparatuses of this invention are flexible to meet the demands thereon during variations of load as well as in starting. The method and apparatuses herein are particularly well adapted to handling abrasive liquids as met in underground fluids. Variations of the method and apparatuses included within the scope of this invention are particularly adaptable to where high pressure and power outputs are needed and limited space is available, as in downwell pumps.

This invention comprises novel functions and cooperations thereof as well as novel combinations and structures of parts as will more fully appear on the course of the description, of which description the drawings attached hereto form a part.

In the drawings wherein like reference characters designate like parts in the several figures, FIGURE 1 is a diagrammatic representation of conditions in an assembly made according to this invention during the initial part of the period during which intake and upward movement of liquid occur in the combustion chamber and air intake occurs in the air compression chamber;

Figure 1:
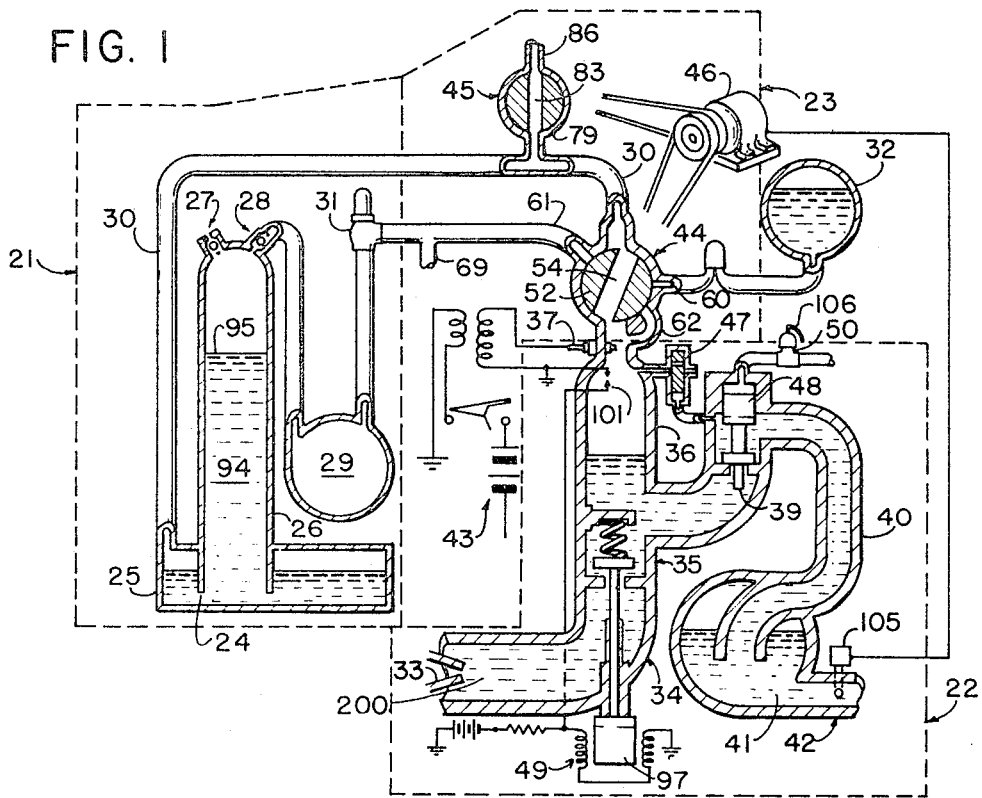
Figure 2:
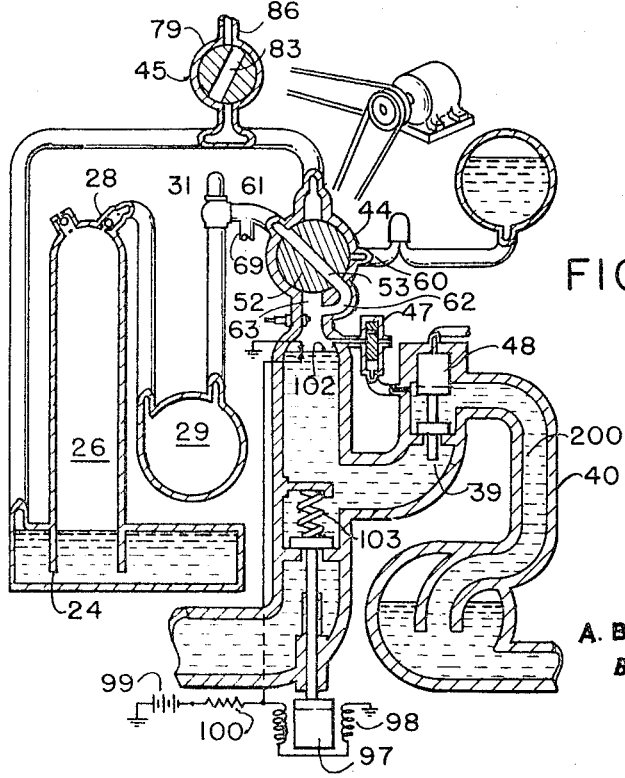
FIGURE 2 is a diagrammatic representation of conditions in the assembly shown in FIGURE 1 during the period following upward motion of liquid in the combustion chamber and during which period compressed air and fuel are injected into the combustion chamber.
Figure 3:
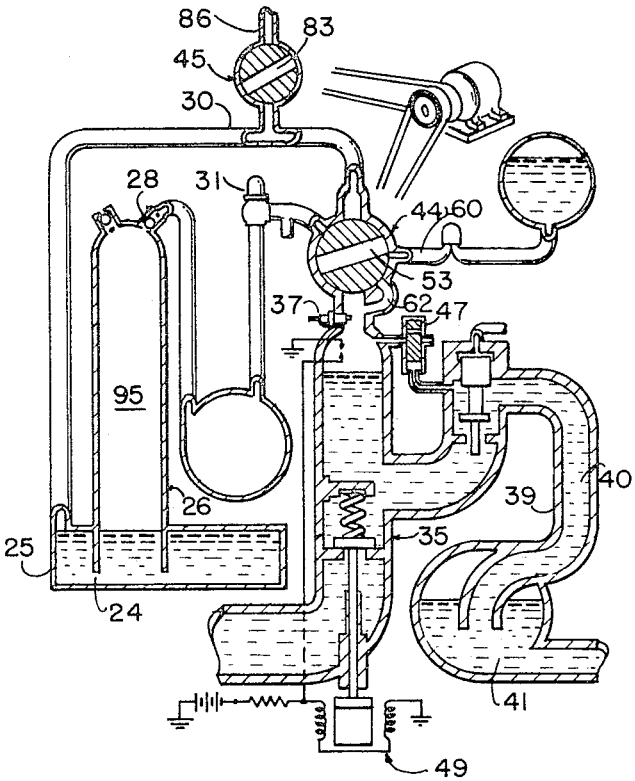
FIGURE 3 is a diagrammatic showing of the conditions in the assembly of FIGURE 1 during the initial part of the power stroke and downward motion of the liquid in the combustion chamber.
Figure 4:
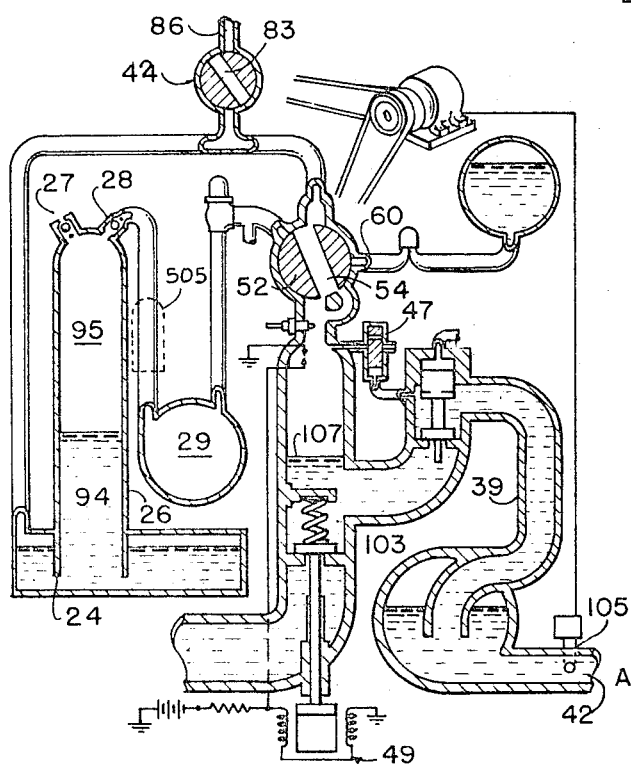
FIGURE 4 is a diagrammatic showing of conditions in the assembly of FIGURE 1 during the initial portion of the period of charging of the air compression cylinder by exhaust gases discharged from the combustion chamber.
Figure 5:
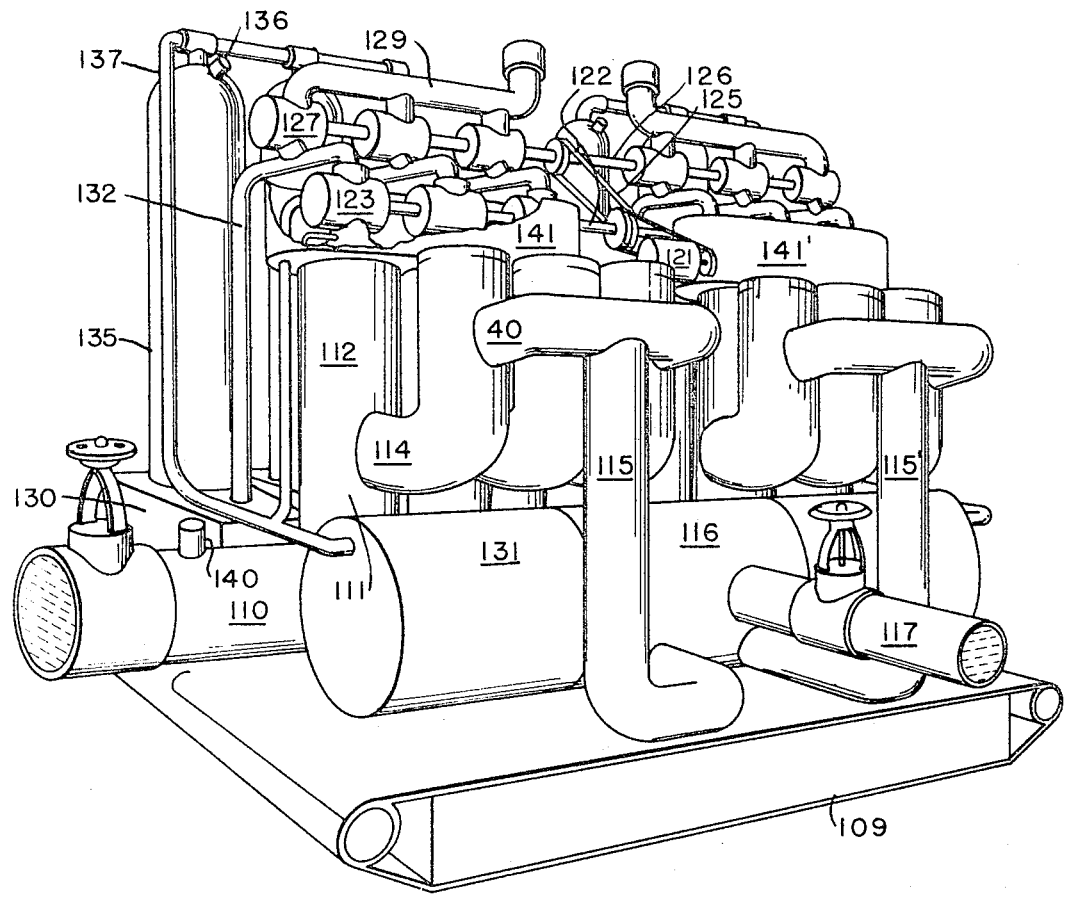
FIGURE 5 is an over-all perspective view partly broken away of a preferred embodiment of a pumping apparatus according to FIGURE 1 of this invention.
Figure 6:
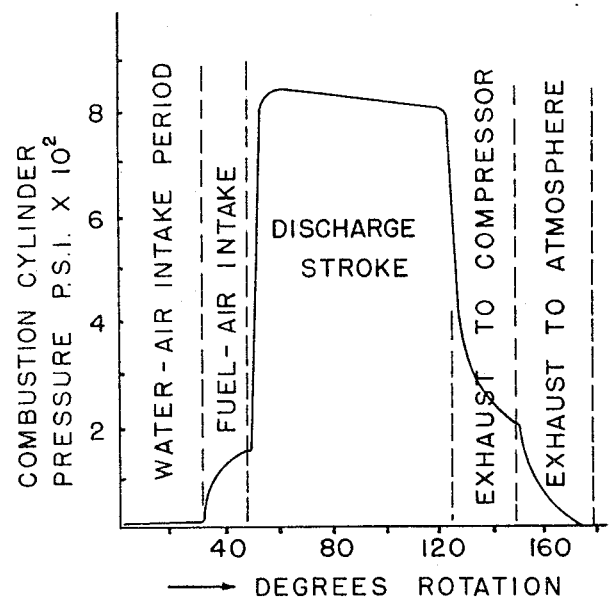
Figure 7:
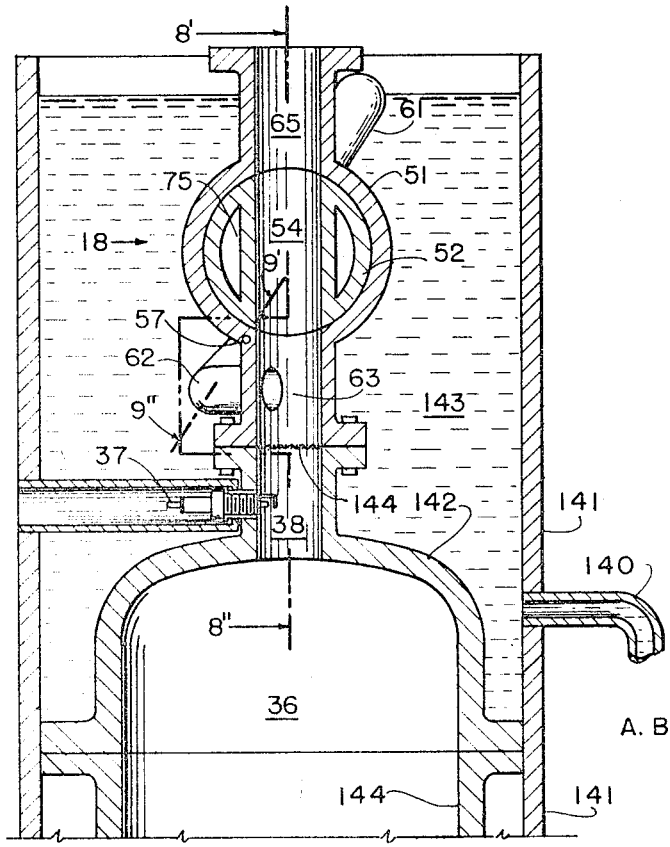
Figure 8:
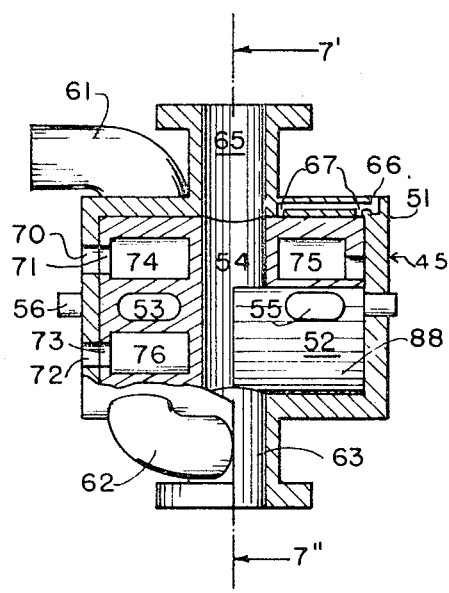
Figure 10:
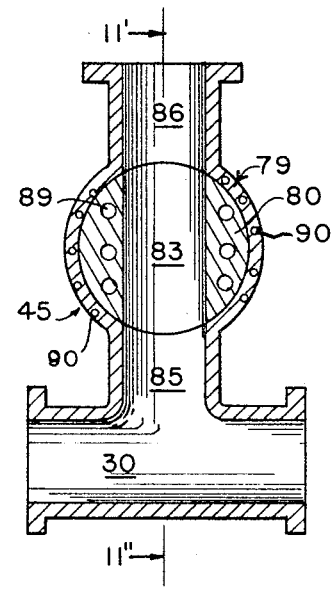
Figure 9:
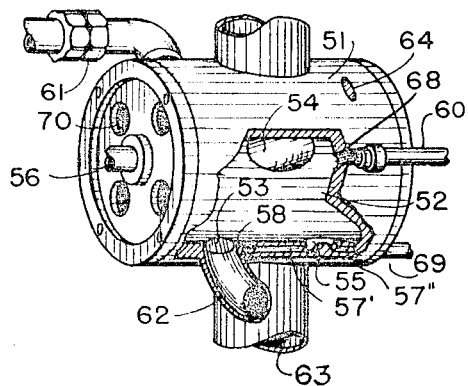
Figure 11:
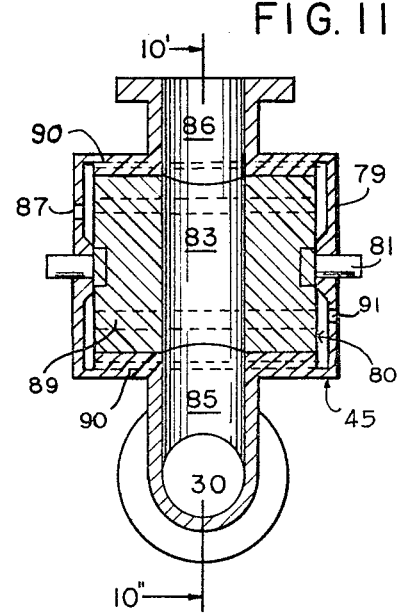
Figure 12:
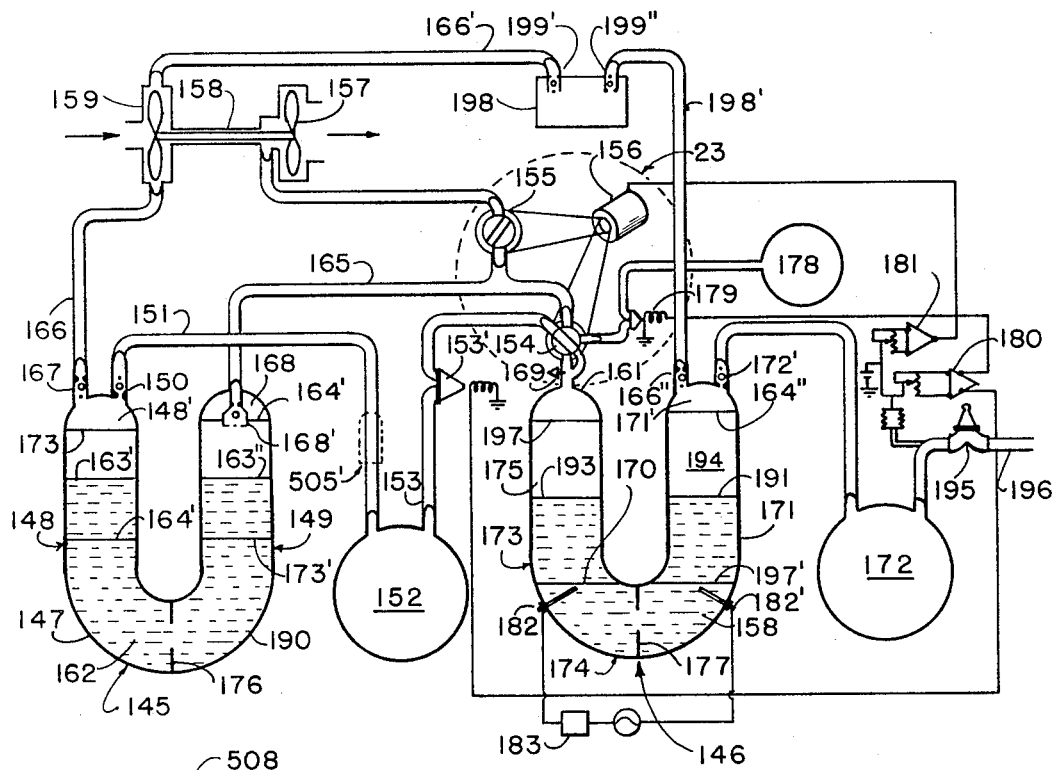
Figure 13:
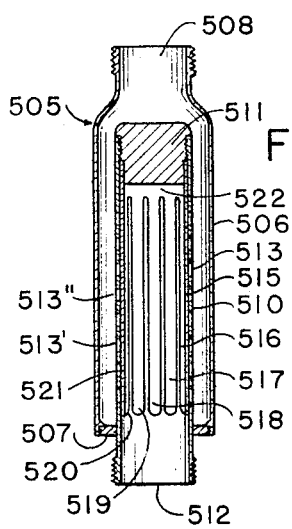

FIGURE 6 graphically illustrates the pressure-time relationships in the combustion chamber of the pump assembly of FIGURES 1 through 5;

FIGURE 7 is a central transverse cross-sectional view of the rotary injection valve and a longitudinal cross-sectional view of the combustion cylinder head and chamber of this invention as seen along a plane normal to the axis of rotation of the body of said valve, said plane being indicated by the line between arrows 7'-7" in FIGURE 8, the direction of this view being given by the direction of the arrows 7" and 7";

FIGURE 8 is a view of the body and housing of the rotary injection valve, partly in longitudinal cross-section along line 8'-8" of FIGURE 7 and partly broken away, as seen along arrow 18;

FIGURE 9 is a perspective view of the rotary injection valve and housing, partly broken away and showing the section seen along plane 9'-9" of FIGURE 7;

FIGURE 10 is a central transverse cross-sectional view of the exhaust valve, along the plane indicated by line 10'-10" of FIGURE 11;

FIGURE 11 is a central longitudinal cross sectional view of the exhaust valve, taken along the plane indicated by line 11'-11" of FIGURE 10;

FIGURE 12 diagrammatically shows in sectional view an alternative embodiment of the pump assembly of this invention;

FIGURE 13 is an enlarged view of a reed valve to be used in the air compressor sub-assemblies of this invention;

FIGURE 14 is a diagrammatic longitudinal cross sectional representation of an assembly comprising the same air compressor and valve sub-assemblies as in FIGURES 1 through 11 and, also, including modification of the pump sub-assembly for the use of this assembly for fracturing downwell formations, said assembly being shown in the combustion chamber condition and timing valve sub-assemby position corresponding to FIGURE 3;

FIGURE 15 is a representation of the components of the assembly of FIGURE 14 in the combustion chamber condition and valve and timing sub-assembly position shown in FIGURE 5; and FIGURE 16 illustrates a modification of the device of FIGURE 14.

This application is directed to a fracturing process and apparatus using the pump assemblies of our co-pending application, Ser. No. 93,110. The fracturing process and apparatus of this invention cooperate with such pump units which are shown in FIGURES 1–12 herein.

The major functional sub-assemblies of the pump unit of FIGURES 1–12 according to this invention comprises the air compressor subassembly shown in the dotted area 21 of FIGURE 1, the pump sub-assembly shown in the dotted area 22 of FIGURE 1, and the timing and valve assembly as shown in dotted area 23 of FIGURE 1.

The air compressor sub-assembly 21 comprises a fluid reservoir chamber 25, compressor cylinder 26, inlet check valve 27 and outlet check valve 28 therefor, air supply tank 29, and an exhaust gas line 30. Fluid reservoir chamber 25 is a closed container. It contains fluid—as water—therein, upwardly extending from said chamber and the liquid therein is the air compressor cylinder chamber 26; the interior of chamber 25 and cylinder 26 communicate through the bottom portions thereof only, below the lower projecting portion of wall 24 of cylinder chamber 26, as shown. The air compressor cylinder chamber 26 has at its top an inlet check valve, 27, and an outlet check valve 28. The outlet of valve 28 operatively connects and discharges into air supply tank 29. The top of chamber 25 is provided with an exhaust gas line 30 which connects the interior of chamber 25 to the exhaust valve and rotary injection valve, as hereinbelow described.

The pump engine sub-assembly 22 comprises a fluid suction pump 33, a fluid suction inlet line 34, a suction valve 35, combustion cylinder 36, cylinder inlet 38, discharge valve 39, discharge manifold 40, discharge surge tank 41, and a discharge line 42. Fluid suction pump 33 is positioned in the fluid suction inlet line 34; one-way inlet or suction valve 35 is located in that line adjacent to and supplies fluid into combustion cylinder 36. At the top of the cylinder 36 is cylinder inlet 38; combustion chamber discharge valve 39 is provided with a valve which is open during a pressure difference thereacross causing a flow of fluid therepast outwardly and automatically closes when such pressure differential ceases; this valve opens to discharge manifold 40 which in turn connects to a discharge surge tank, 41, which supplies the high pressure discharge line 42.

The timing and valve sub-assembly 23 comprises, an ignition system, 43, a rotary injection valve, 44, a rotary exhaust valve, 45, a variable speed control motor 46, equalization piston 48 and bleed off 47, a suction valve control system 49, and a discharge valve control 50.

The ignition system is a conventional coil ignition system provided with a spark plug 37 attached to the combustion cylinder inlet 38. The rotary injection valve 44 is attached to the top of the combustion cylinder and is provided with openings for passage of gaseous mixtures into said cylinder, and for passage of gases from said cylinder to the rotary exhaust valve 45. The rotary exhaust valve is operatively connected to the rotary injection valve and to the exhaust line 30 of and to the atmosphere or, as described below, to a supercharging system. A variable speed control motor 46 drives the rotary injection valve and the exhaust valve and the ignition system to provide for the rotation of said valves as below described and for an electrical discharge across the spark plug 37 when the rotary injection valve body presents to combustion cylinder inlet 38 a solid surface and thereby closes off exits from the top of said combustion cylinder prior to igniting of the fuel-air mixture in the combustion cylinder.

The rotary injection valve comprises a housing 51 with a valve body 52 therein. The rotary injection valve housing is provided with a cylindrical cavity 88 therein for a valve body 52; the valve body is generally cylindrical in outline and rotatably fits in said cavity; the body has several passages and chambers therein; it has a diametral air passage 53 with its length transverse to the longitudinal axis of the valve body; the passage is rectangular in cross-section—with rounded edges however—and its cross section is longer in the direction of said longitudinal axis than in the direction transverse thereto.

This passage connects housing air inlet 61 and fuel air injection line 62 of the housing when said valve body is oriented as shown in FIGURE 2, discussed below. Spaced longitudinally along said longitudinal axis of said cylindrical valve body a distance from the central longitudinal axis of the passage 53 is an exhaust passage 54 in said valve body; this passage is cylindrical in cross section and matches the inlet and outlet passages 63 and 65 of the valve housing, below described; cylindrical passage 54 has a central longitudinal axis which is diametral with respect to the cylindrical valve body 52; passages 53 and 54 are sufficiently spaced to avoid any contact between the walls thereof.

The longitudinal axis of passages 53 and 54 are at an angle to each other to provide for the sequence of connections below described for the cycle of operation shown in FIGURES 1–5, below described.

A fuel recess is provided in the valve body 52; this recess has an opening to the surface of said body.

The housing 51 for the rotary injection valve has an exterior opening for air inlet passage 61 on the top of said housing and an interior opening to the cavity 88 within said housing; fuel-air injection line 62 has an opening in said cylindrical housing cavity: these openings to the housing cavity are connected through passage 53 of the valve body only when such body is in the position below described for FIGURE 2. Neck 63 of the housing has one orifice which opens to the cylindrical cavity 88 in the valve housing, another orifice whereat line 62 opens thereinto, and another orifice connected to the combustion chamber inlet 38. A passage 65 provides, with passage 54 oriented as shown in FIGURE 8, for movement of exhaust gases to the exhaust valve 45 from the combustion chamber via neck 63 of the housing. The housing lubricant outlets open to the housing cavity 88 and open to the exterior of the housing, as inlet 66, and the lubricant is distributed by passages in the housing, as 67, to the surface of the valve body 52.

Fuel line 60 enters passage 68 in the housing and carries fuel therethrough to the fuel chamber 55 in the valve body. The housing is provided with a fuel transport passage 57' at one end of which is located orifice plate 58, and the other end of said passage opens to the cavity 88 in said housing; a passage 57" passes from an adjacent opening in said cavity to the exterior of said housing whereat is located fuel-air line 69. Recess 55 is placed in the valve body so that the opening thereof on the surface of the valve body covers the openings into cavity 88 of passages 57' and 57". Accordingly, when the fuel chamber 55 provides for connection of passages 57' and 57" air fed from fuel-air line 69 into fuel transport passage 57' flows into chamber 55, mixes with the fuel therein—either gaseous or liquid—forming a mixture therewith which is carried through passage 57" to orifice 58 and there that fuel-air mixture is sprayed into the fuel-air injection line 62.

The valve body is held in the housing by end plates on the housing and shaft 56 serves to turn the valve body in the cavity 88 in timed relation with exhaust valve 45 and ignition system 43 all driven by motor 46 at such speed as is desired, e.g., about 50 r.p.m.

Valve housing 51 is provided with a coolant inlet 70 matching coolant inlet 71 of the valve body. The housing further is provided with a coolant outlet 72 corresponding with the coolant outlet 73 of the valve body. The valve body coolant inlet connects to the coolant inlet chamber 74 which in turn connects to the central chambers 75 on the other side of the valve body and coolant outlet chamber 76. The drive shaft 56 provides for movement and control of the position of the valve body relative to the housing.

Exhaust valve housing 79 is provided with a cylindrical cavity wherein cylindrical exhaust valve body 80 rotatably yet firmly fits.

The exhaust valve 45 comprises a housing 79 and a valve body 80. A drive shaft 81 on the body provides for control of the position of said body. The body has an exhaust passage 83 which connects to the exhaust line 30 by neck 85 and exhaust discharge 86. Coolant inlet 87 of housing 79 provides coolant to the exhaust valve body coolant passages 89, and hence to the exhaust valve housing passages 90 to exhaust valve housing outlet 91. Passage of coolant through these passages helps maintain the temperature and dimensional stability of these valves and preserves the tolerances necessary for close sealing fit and proper operation of the assembly.

The conditions occurring in the pumping, compressor, and valve assemblies during each of the two strokes which form one cycle of operation are illustrated in FIGURES 1 through 5. Generally, during each cycle of a pump unit, according to this invention, the fluid to be pumped is introduced by the suction line pump 33 to the suction valve 35 filling the combustion cylinder 36, is discharged under the influence of combustion in the combustion cylinder through the discharge valve 39, and flows through the manifold 40 into the surge tank 41 and out through the common discharge line 42.

FIGURE 1 illustrates a point in the operational cycle which may be regarded as the beginning of such cycle for purposes of description. At the point illustrated in FIGURE 1, the rotary injection valve body is positioned so that the exhaust passage 54 therethrough provides for free movement of combustion gasses from the combustion cylinder to the exhaust valve 45 where passage 83 is then in its full open position. Concurrently, exhaust gasses pass from the fluid reservoir box 25 through the exhaust gas line 30 to and through the exhaust valve 45 and passage 83. These gasses were initially exhausted from the compression and combustion cylinders by the pressure therein, which pressures were those applied by the weight of fluid 94 in the compression cylinder and the pressure of gas, 95, thereabove in cylinder 26, as shown in FIGURE 5, as well as the pressure—equal to discharge line back pressure—existing in combustion cylinder 36. At the moment shown in FIGURE 1, the expelling force is only the pressure of suction pump 33 in cylinder 36 and the difference in height between the level of the column of liquid, 94, in the compressor cylinder and the level of such fluid in the fluid reservoir box 25. At the moment shown in FIGURE 1, fresh air enters the compressor cylinder through inlet check valve 27 while back pressure in the air supply tank 29, which pressure is predetermined by the setting on pressure regulator 31, holds the outlet check valve 28 closed, while fluid enters the combustion cylinder through suction valve 35 which has been opened by the positive pressure provided by the solenoid 97 operating against spring 103, as shown in FIGURE 1. During the moment illustrated in FIGURE 1, the water level is rising in the combustion cylinder as shown by the arrows at the fluid level 94, and falling in the compression cylinder. The suction valve 35 is held in the open position against spring 103 by the suction valve control system 49: this system comprises solenoid 97 and a solenoid circuit, 98; this circuit comprises a series connected E.M.F. source 99, resistor 100, and a fixed astatic gap 101, connected to the circuit so as to short out the solenoid when fluid in the compression cylinder rises to a desired level, 102, in the cylinder. Thereupon the solenoid is deenergized and the spring 103 closes the suction valve against the suction line pressure. The astatic gap switch provides a control of fluid level to within plus or minus ½₂ inch.

The rotary injection valve and exhaust valve rotate continuously under the energization of the variable D.C. timing motor 46. Accordingly, the rotary injection valve is rotated past the position shown in FIGURE 1 to the position shown in FIGURE 2. In this position exhaust passage 54 is closed off from passages 63 and 65 in housing of the rotary injection valve. At this time the air injection passage 53 in the valve body 52 is brought in line with the passages 61 and 62 therefor in housing 51. Thereupon, as shown in FIGURE 2, air from the supply tank 29 (at 100 to 200 p.s.i.g. in the embodiment below described in detail) passes, serially, through the pressure regulator 31—set to close at from 100 to 200 p.s.i.g.— air line 61, valve body air inlet passage 53, valve housing passage 62, and hence, into the inlet 38 and interior of the combustion cylinder 36. Concurrently air passes from line 69 to mix with the fuel theretofore held in the fuel chamber 55 and as shown in FIGURE 9 carry the thus-formed mixture through the fuel transport passage 57' to the orifice plate 58 and there form a spray of said mixture into the stream of air passing through the passage 62.

The fuel-air mixture so made swirls into the combustion cylinder from the air inlet line 62 past the points of spark plug 37 and, therefrom, into the combustion chamber. This flow of fuel-air mixture serves to remove any moisture which may have gathered on the points of the spark plug and forms a compressed air-fuel mixture in cylinder 36. At this point in the operational cycle shown in FIGURE 2 the level of water in the compressor cylinder 26 has reached the level in the fluid reservoir box 25.

As shown in FIGURE 3, continued rotation of the rotary injection valve body, via its drive shaft 56, closes off the air inlet passage 53 from the feed and outlet passages therefor in the rotary injection valve body housing 51 and also closes off fuel-air line 69 passage from its connection with the interior of the combustion chamber. The rotary injection valve housing is provided with a breather slot 64 whereby to bleed off to the atmosphere the air under pressure trapped in the fuel chamber 55 prior to refilling said chamber by the fuel supply.

The ignition system 43 is a part of the timing and valve assembly and is, as in conventional systems, through condensers, capacitors, and breaking points, timed to deliver a high tension spark to spark plug 37 after the above-described closing off of the air passage 53 and the fuel air line 69 from the combustion chamber. The spark initiates combustion in the combustion chamber, then filled with the compressed fuel-air mixture previously added. Pressures needed to pump the liquid—over 800 pounds per square inch in the embodiment below described—are thereby developed in the combustion chamber and the fluid in the combustion cylinder passes out through the discharge valve 39 and, thence, into the discharge manifold 40 and the surge tank 41. The discharge of fluid from the combustion chamber continues until the combustion chamber pressure no longer exceeds the discharge pressure and the fluid momentum is dissipated, whereupon the discharge valve is closed, as shown in FIGURE 4.

As shown in FIGURE 4, the continued rotation of the valves 44 and 45 by the timing motor brings the exhaust passage 54 of the rotary injection valve body to connect the interior of the combustion chamber with the exhaust opening 65 and line 30, while the rotary exhaust valve is still in the closed position. Accordingly, the exhaust gases from the combustion cylinder, under approximately the same pressure as the discharge pressure in manifold 40, expand and force fluid 94 in the reservoir box and air 95 thereabove upwardly at high pressure. The air 95 flows past the outlet check valve 28 into the air supply tank 29. Thereby the gases in the compression chamber 26 are substantially all transferred to the air supply tank 29. The rotary injection valve and rotary exhaust valves are kept open by the timing control concurrently for a sufficient period of time to bleed the compressor fluid reservoir box 26 and the combustion cylinder 36 substantially to atmospheric pressure after this transfer.

The volume of the fluid in the fluid reservoir box 25 above 24, the lower end of the compression cylinder, will not quite fill the compressor cylinder thereby preventing excessive expansion of the exhaust gases from discharging compressor fluid into the air supply tank. The amount of such liquor in the fluid reservoir box, including variations due to condensation and evaporation, is compensated for by a conventional fluid level regulating system.

Thereafter, the timing motor drives the rotary exhaust valve to the position shown in FIGURE 5 at which point exhaust valve passage 83 connects line 30 to the atmosphere and the gasses under pressure in the reservoir box 25 and in the combustion chamber will exahust to the atmosphere or to a pump, as 264 in FIGURE 5, for pre-compression of air passing to the compressor cylinder using the energy of these exhaust gasses.

The pressure in pump cylinder 36 thus drops to atmosphere which is below the pressure in pump suction line 34. This change in pressure permits the energizing solenoid 97 on the suction valve control system to overcome the action of suction valve spring 103 and opens the suction valve 35. Thereupon fluid enters the combustion cylinder 36.

When the pressure in the compressor reservoir box 25 drops to atmosphere or below the amount required to close the inlet check valve 27 the level of the fluid column 94 within compressor cylinder 26 drops, taking in fresh air through the inlet check valve 27.

Following this, the movement of the valves 44 and 45 effects the conditions and operations above-described for FIGURE 1, thereby completing the cycle of operation on each 180° of rotation of the exhaust and injection valve bodies.

The pressure-time relationships of FIGURE 6 indicate the relative times of the various portions of the above-described cycle and the pressure in the combustion cylinder 36 during such periods, in a typical operation of the method and apparatuses of this invention.

Transducer measurements of the discharge pressure in the discharge line control the speed of the D.C. motor 46, and so vary the number of revolutions per minute of the valves 44 and 45, and so maintain a constant discharge pressure in the line 42 against a varying load. Further, over-pressure safety switches in the discharge line, as at 105, stop the D.C. motor instantly to provide a high degree of operational safety.

During starting discharge line pressure would be negligible under most operating conditions. Injection of a compressed fuel-air charge into the combustion cylinder 36 would then discharge fluid from that cylinder prematurely. Therefore, an equalization system is provided to hold the discharge valve 39 closed during fuel-air charge injection until the line pressure exceeds air injection pressures. Accordingly, regulated air pressure forces the rod on equalization piston 48 in discharge valve chamber against the discharge valve 39 and holds that valve shut until ignition occurs. When the discharge line pressure exceeds the regulated air pressure on top of the equalization piston then the discharge fluid pressure forces the equalization piston upward allowing the discharge valve to then function in the usual manner above-described. A manual disconnect, as 106, of this equalization system is actuated after such usual manner of operation has begun.

Additionally, a bleed-off valve assembly 47, comprising a bleed chamber, a bleed piston, and connection of said chamber to the discharge line, is provided to limit the combustion chamber pressure to a lower level during starting and so prevent the discharge of exhaust gases into the surge tank. When discharge pressure builds up, this valve will be forced upward closing off the bleed port in the bleed piston. Also, in the event of a sudden loss of discharge line pressure the bleed-off valve will again open to prevent over expansion of the exhaust gases in the combustion cylinder and the discharge thereby of exhaust gases into the discharge surge tank.

Starting is accomplished in the embodiment below described by use of a hand pump to charge the air reservoir 29 to 200 pounds p.s.i.g. The combustion chamber pressure in such embodiment is limited by the bleed-off valve as above described until the fluid output pressure equals 450 p.s.i., and the fluid discharge valves are controlled by equalization pistons as above described until the output pressure equals the air intake pressure.

A six-cylinder pump made according to this invention is shown in FIGURE 5. This machine is shown as mounted on skids 109 for handling, moving, and mounting. Fluid enters through suction line 110, flows through suction valves located as at 111 into combustion cylinders as at 112. Under the influence of combustion in said cylinder, said liquor flows to the discharge valve as 114, discharge manifold 115, and into a surge tank, as 116. All six cylinders discharge into one surge tank and out through a common discharge 117. Each cylinder is a part of a pump unit comprising the pumping, timing, and compressor sub-assemblies as above described for FIGURES 1 through 5. All six rotary injection valves and all six rotary exhaust valves are rotated by a common variable-speed D.C. electric motor 121. Motor chain belt 125 from motor 121 drives sprocket-teeth on the drive shaft 126 and 122 whereby timing thereof is coordinated with such valve bodies as above-described and with the electrical spark mechanism and spark plug as 43, in the manner above described for FIGURES 1 through 5.

A drive shaft 122 operates the rotary injection valves 123 and drive shaft 126 control the exhaust valves as 127. An exhaust line, as 129, provides for exhaust. The fluid reservoir box 130 is connected to air supply tank 131 which is in turn connected to the rotary injection valve. Exhaust gas line 132 connects to the rotary exhaust valve 127 and injection valve 123 in the manner above diagrammatically illustrated in FIGURES 1 through 5. The air compressor 135 is provided with an inlet check valve 136 and the outlet check valve 137.

A particular example of operation of the above-described embodiment according to this invention produces an output of 800 gallons per minute at 800 p.s.i.g., or 375 hydraulic horsepower. The fuel used in such an apparatus is commercial propane with a heat value of, for example, 19,994 British thermal units per pound at a specific weight of 4.24 pounds per gallon at 68° F. and 123 p.s.i. About 160 pounds of such fuel are used per hour for the total six cylinder engine. The vapor pressure of such fuel material would be 124 p.s.i. at 70° F., 167 p.s.i. at 90° F., 192 p.s.i. at 100° F. Such fuel has an ignition temperature of 920° F. to 1020° F., and between 4.2% and 4.5% of such gas in the air gives flame temperature of over 3600° F. The actual thermal efficiency on such apparatus is about 35%. The fuel rate per pulse is .00444 pound per pulse or a total of 159.8 pounds per hour. The air weight per pulse is .0686 pound per pulse or a total of 2,470 pounds per hour. The theoretical horsepower is thus 1,113.7 H.P. and provides an estimated thermal efficiency of 35.9%. The approximate gross weight of the pump unit is 3,500 pounds and the approximate gross weight of the compressor is 3,000 pounds. The optimum valve speed is 50 r.p.m. and is, of course, adjustable to rotate at 50 r.p.m. or as high as 100; this 5 r.p.m. value speed provides 100 cycles per minute. Venting the exhaust gasses from the rotary exhaust valves through a turbine section of a supercharger, forcing air from the compressor section of the supercharger through the inlet check valve of the compressor cylinder, as described for embodiments of FIGURES 5 and 13, results in efficiencies exceeding those of conventional diesel engines.

The compressor cylinder in such embodiment has an internal diameter of about 7⅝ inches (45.66 square inches cross-section) and a stroke of about 7¼ inches for a total displacement of 1991 cubic inches and a compression ratio of 11.1.

The valve body on exhaust and on rotary injection valves is made of stainless steel (440C) hardened and finely machined to plus or minus 1/10,000 inch after the machine and grinding work thereon had been done. Such valve bodies have thermal coefficient of expansion slightly less than that of the mild steel valve housing. Full pressure lubrication is obtained with molybdenum disulfide emulsified in a silicone-phosphate vehicle.

The rotary injection valve body used in the above described embodiment is cylindrical; it has a diameter of 4 inches and a length of 6 inches. Transverse to the longitudinal axis of said cylinder fairly in the center of said valve is located the axis of the exhaust passage 54, said exhaust passage having a diameter, in the above embodiment, of 1½ inches, which corresponds to the internal diameter of the exhaust line 65.

The air inlet passage 53 is rectangularly slot-shaped, as shown in FIGURE 7, to provide a long path for the spray of fuel from passage 57 and to shorten the time required for the injection of the fuel air-charge. The longitudinal axis of passage 53 is parallel to the plane of the exhaust passage through the rotary injection valve and also in a plane normal to the longitudinal axis of that valve body. The central longitudinal axis of this air inlet passage is at 90 degrees to the central longitudinal axis to the exhaust passage in that valve body. The rotary injection valve housing 51 provides ports for such air inlet passage at 30 degrees to the exhaust passage axis as shown generally in FIGURES 8 and 9, whereby the time relationships above described are effected. The fuel chamber 55 has a sufficient volume (about 0.25 cubic inch in the preferred embodiment) to provide the amount of energy needed per unit stroke.

Water cooling is effected through the inlet ports 70 in the rotary injection valve body through the coolant inlet chamber 74 on the left of FIGURE 8 and around the exhaust passage 54 to central coolant chamber 75 and then again past the air inlet passage and to coolant outlet chamber 76 and a cooling outlet 72. The exhaust valve is similarly cooled. A water jacket 141 is provided for the combustion chamber housing 142 and rotary injection valve housing 51. It should be noted that, notwithstanding the pressure of about 800 p.s.i. developed in the combustion chamber, and the high instantaneous ignition flame temperatures, as shown in FIGURE 3, said total force bearing on the valve body is borne by the rotary injection valve over an area substantially larger than that to which the 800 p.s.i. existing in the combustion chamber is applied. Accordingly, in combination with temperature control, close machining and high pressure lubrication, entirely adequate sealing against loss of pressure gases is effected.

According to this invention high fluid pressures can be developed to overcome the starting loads imposed upon the hydraulic motor. As torque requirements to move the load increases pump displacement according to the device of this invention may be increased, using higher r.p.m. of the hydraulic motor.

Pressure produced by the method and apparatus of this invention can presently be readily furnished up to 2,000 pounds per square inch. Increase of the pressure with which the fuel supply is passed to the fixed volume fuel chamber 55 or increase of the size of said chamber on the rotary injection valve provides for a greater weight of fluid moved per each revolution of the rotary injection valve body. Also, the variable speed D.C. motor may increase the rate of rotation of the exhaust and injection valves. Accordingly, a great variation in the output energy of the machine is achieved by increasing either fuel-air injection pressure or weight of fuel combusted or increasing the rate of constant composition air-fuel mixture consumption by increased r.p.m. of the valves. It will also be noted that in the device of this invention moving parts are reduced to a minimum. Also, bringing the fluid pistons to the same level in the engine cylinder on each cycle and injecting the fuel-air charge under predetermined regulated pressure allows the injection of the same quantity of fuel and air in each cycle regardless of the speed of operation. Cams are not needed and the only wearing surfaces are in valves 45, 44, 35, and 39.

The device of FIGURE 5 is only seven (7) feet long, 66 inches wide and 66 inches high, and has the characteristics given in Table I hereinbelow.

In FIGURE 5, the water jacket 141 for the three cylinders discharging into manifold 115 is shown partly broken away to illustrate some of the interior relations thereof; corresponding jacket 141' for the other three cylinders discharging into manifold 115' is shown in its usual position. Cooling line 140 feeds fluid—as water— into jacket 141 to cool cylinder head 142, as by water 143 in said jacket and cools the lower cylinder walls 144 by flowing through the cooling chamber between jacket 141' and said wall. By such cooling the dimensional and structural characteristics of the valve and combustion cylinder are maintained notwithstanding the use of the elevated flame temperatures concomitant on the ignition of combustible fuel-air mixtures as above described injected into a combustion cylinder at pressures of 200 p.s.i.g. and upward. The known advantage of high temperature and high thermal and economic efficiency concomitant on use of such high combustion temperatures are readily permitted by the use of an injection valve as 44, as above described, which permits high pressures to be used in the combustion chamber safely and efficiently, without the wear and fatigue problems concomitant on use of reciprocating valves. Valve 44 provides a large bearing surface to withstand those forces which the valve surface open to the combustion chamber during combustion must withstand under high temperatures provided by use of igniting high pressure fuel-air mixtures. A 20-mesh tungsten screen, 144, is provided in the flange at neck 38 to protect the valve face and other structures otherwise directly exposed to the combustion reaction.

It will be noted that the device of this invention is able to tolerate suspended abrasives, and avoids high rotational speeds and use of packing glands and wear rings by direct conversion of the heat energy of fuel directly into hydraulic energy. A 375-hydraulic-horsepower pump unit made according to this invention described above and shown in FIGURE 12 replaces a skid mounted oil field mud pump unit and its power plant which will displace 800 gallons per minute at 800 pounds per square inch. A comparison of these two units is made in the following Table I.

TABLE I

| Pump Unit | 600 BHP Engines 7¾" x 16" Pump | 6 Cylinder 375 HHP Pump of this invention |
|---|---|---|
| Displacement | 800 g.p.m. / 800 p.s.i. | 800 g.p.m. 800 p.s.i. |
| Gross Weight | 60,000 pounds | 7,500 pounds. |
| Overall Dimensions | 24' x 8' x 6' | 7' x 5' x 6'. |
| Initial Cost | $75,000.00 | $45,000.00. |
| Estimated Monthly Maintenance | $1,000.00 | $100.00. |
| Total Moving Parts | 2,000 | 100. |

An alternative embodiment of this invention is shown in FIGURE 13, wherein the compressor and the combustion chamber operate with U-shaped chambers to take advantage of the oscillation period of the liquid in such chambers. Orifice plates are provided to more closely control the frequency characteristics of such oscillations. In this embodiment, a gas discharge is effected and a floating check piston is used rather than the astatic gap above described for control of the intake valve to the combustion cylinder.

The apparatus of FIGURE 12 is another embodiment used in the process of this invention. It comprises an air compressor sub-assembly 145, a generally U-shaped engine sub-assembly 146, a turbine supercharger 158 and a valve and timing sub-assembly as 23 discussed above all cooperating as one assembly.

The air compressor sub-assembly 145 comprises a U-shaped tank 147 with vertical upstanding cylindrical arms 148 and 149 joined by a hollow C-shaped portion 190: each arm, except as below described, is closed at its top. The C-shaped portion is filled with liquid 162, and said fluid extends, at rest, to level 163' in arm 148 and to level 163'' in arm 149 when that liquid is at rest; levels 163' and 163'' each extend to one-half way up the height of the vertical portion of said vertical cylinders. The top of arm 148 is closed to form a chamber 148'. The top of that chamber opens to a one-way inlet valve 167 into which inlet line 166 feeds. A one-way discharge valve 150 is also located at the top of chamber 148' and connects the interior of said chamber to compressed air discharge line 151.

The top of arm 149 is closed to form a chamber 168; line 165 connects the top of that chamber to the rotary exhaust valve 155 of the valve and timing sub-assembly 23 of this assembly. A valve 168' in chamber 168 has a floating ball which prevents passage of liquid 162 into line 165; but such does not interfere with the passage of gas to and from line 165. Chamber 148' is connected through a one-way discharge check valve 150 and line 151 to an air reservoir tank 152; air tank 152 connects and discharges through a line 153 and pressure regulator 153′ (set at 200 p.s.i.g. in the preferred embodiment) to a rotary injection valve 154 of a valve assembly 23 which acts, as shown in FIGURES 7, 8, and 9, as valve 44 of assembly 23 of FIGURES 1–11 to pass air and fuel to the combustion chamber 160 below described by operations the same as those above described for the embodiment of FIGURES 1 through 11. The discharge of the exhaust valve 155 in this embodiment is connected to the turbine wheel 157 of supercharger 158 at the air intake of which is a compressor wheel 159 which supercharges the air passing to the air compressor chamber 148′. The U-shaped engine sub-assembly 146 has a right hand upright cylindrical discharge arm 171 connected to air supply tank 172, and a left hand upright cylindrical combustion chamber arm 173 connected to the rotary injection valve 154. Arms 171 and 173 are vertical right cylinders upwardly directed and closed, except as below described, at their tops and are open to and connected at their bottom by a C-shaped hollow portion 174. Fluid 158 fills the C-shaped portion and extends, at rest, to level 191 in arm 171 and to level 193 in arm 173. Levels 191 and 193 each extend one-half up the height of the vertical portion of each of said vertical cylinders. The top of chamber 173 is connected to the rotary injection valve 154 of sub-assembly 23 in the same manner as combustion cylinder 36 is attached to rotary injection valve 44 in FIGURES 1–12. The top of chamber 171′ formed at top of closed arm 171, is connected to an inlet line 198′ and line 166′ from the supercharger fan 159 through a one-way inlet valve 166″; the top of the chamber 171′ is also connected by one-way discharge valve 172′ to air supply tank 172 which holds a reservoir of high pressure gas in the same way surge tank 41 holds high pressure fluid. One-way discharge valve 172″ on top of chamber 171′ provides for compression of the gas as 194 in chamber 171′ above the level of the liquid 158 in arm 171, and discharge of such compressed gases only when the pressure in the reservoir 172 is exceeded by the pressure of the gas overlying the liquid 158 in the arm 171. A regulator 195 is attached to the discharge line 196 of the tank 172, and holds that pressure at about 800 p.s.i.g. in the preferred embodiment.

The portion of the chamber 173 above the liquid level 193 in closed arm 173 is referred hereinafter as combustion chamber 175; it has an inlet 161 like inlet 38 of chamber 36 hereinabove.

In the beginning of the cycle using the device of FIGURE 12, the rotary injection valve 154 (identical in structure to valve 44 above-described) moves to the position whereat communication is made between the inlet 161 of the combustion chamber 175 and the exhaust line 165 as shown in FIGURES 1, 7, and 8. At this time, also, the rotary exhaust valve 155, identical to valve 45 of FIGURES 1–11 is full open as in FIGURES 10, 11, and 1 above. Air from the supercharger 158 then moves fresh air into line 166 past inlet valve 167 and into chamber 148′; thereupon fluid 162 in the air compressor tank 147 moves from the static of rest levels 163′ and 163″ to the levels shown as 164′ and 164″.

Thereafter, the rotary exhaust valve 155, driven by motor 156, closes and the rotary injection valve 154, also driven by said motor, passes to a position as shown for valve 44 and 45 in FIGURES 2 and 9 above, fuel passed to valve 154 from its storage source 178 and is admixed with air and a combustible fuel-air mixture is injected into the combustion chamber 175, as above described for valve 44.

Under the influence of the driving D.C. motor 156, the rotary injection valve 154 then closes off air line 153 and the ignition system, as 43, is activated: ignition of the spark plug thereof as 169 then occurs and causes combustion of the fuel-air mixture and increased pressure in cylinder 175 by the resultant combustion gases; the resultant expansion of those gases forces the fluid 158 in combustion chamber 175 from level 197 down to level 170 and moves fluid on the right hand arm 171 from level 197′ up to the level 164″. This compresses the air in chamber 171′ and discharges the thus-compressed air from chamber 171′ to the air-supply tank 172. The residual thus compressed gas in chamber 171′ is held at pressure of chamber 172—usually 800 p.s.i.g.—by check valves 172′ and 166″.

Following combustion and the discharge of compressed air to the air supply tank 172, the rotary injection valve 154 continues its rotary movement and the relationship of valve components as shown in FIGURE 4 for valves 44 and 45 is substantially achieved. Thereupon combustion gases from the chamber 175 exhaust to the air compressor chamber 168 via line 165 thereby forcing the fluid in arms 148 and 149 to levels 173 and 173′, respectively, and thereby compressing the air in chamber 148′ and discharging that thus compressed air via line 151 to the engine supply tank 152; this occurs by expansion of gases in chambers 171′ and 175 initially approximately at the pressure of the line air-supply tank 172.

Thereafter, when rotary injection valve moves to the exhaust position and the rotary exhaust valve 155 opens, as above described for valve assembly 23 of FIGURES 1–11, pressure in chamber 171′ completes the movement of fluid 158 from level 170 to level 197 in arm 173 and the chamber 168. Pressure on fluid 162 in the arm 149 of air compressor cylinder is thus released against the pressure in line 165 and that fluid then rises to the level 164″. Thereby, the gases in chambers 175 and 168 are exhausted through the turbine wheel 157 preparatory to the next cycle of air intake and compression. A float valve 168′ in chamber 168 prevents discharge of liquid 162 to line 165.

Air compressed by and discharged from compressor fan 159 passes to the air compressor chamber 148′ above fluid 162—then at level 164′—via line 166 and, also, by line 166′ and 198′ into chamber 171′ of arm 171 of the engine assembly 146 above fluid 158—then at level 197′. A reservoir as 198, provided with one-way valves, as 199′ and 199″ shown in line 166′ may also be provided in line 166. The assembly of FIGURE 12 accordingly provides for compression of air by liquid 158 in the arm 171 of U-shaped sub-assembly 146 and for its discharge to and storage in the chamber 172. The same high discharge pressures (as 800–2,000 p.s.i.g.) and equivalent discharge volume and efficiencies (using the same fuel) are accordingly obtained with the device of FIGURE 12 as obtained with the device of FIGURES 1–11 above described.

The liquid 158 used in sub-assembly 146 when air is pumped may be water. However, hydrocarbon oil may vaporize and explode at the high pressures achieved in the engine sub-assembly of this device. Accordingly, relatively inert liquid of low melting point, high boiling point, and low vapor pressure and a higher specific gravity than the fluid being pumped from such sub-assembly 141 may be used; silicone base liquid plastic is preferred for air pumping, mercury for water and oil, molten lead and molten sodium for inert gasses. For purposes of keeping the molten metals liquid heating electrodes as 158 and 158′ are used in tube 146. The material of which the U-tubes 145 and 146 are made may be steel when air is pumped, but tube 146 should be ceramic lined when molten aluminum, lead or zinc is being pumped, as into dies and the walls of said chamber are then heated by conventional means to maintain the metals fluid.

The fluid piston, as 251 made of material inert to the combustion gases thereabove and the liquid therebelow as silicone plastic for air pumping, etc., may also be used in the embodiment of FIGURE 12.

The device of FIGURE 12 may pump from chamber 171′ inert gases (fed via line 198′) or water or oil or molten metal for use in dies.

In the preferred embodiment, orifice plates of adjustable internal diameter are provided as at 176 and 177 to control the frequency of oscillation of the liquid in each U-shaped tube as 146 and 147. Thereby the natural frequency of such columns of liquid can be utilized to provide a steady number of firings per unit of time. In such instance the power output is regulatable by increasing the pressure on the fuel fed from tank 178 through fuel regulator 179, e.g., a spring solenoid type, controlled by a motor control 180 sensitive to the pressure in the line air-supply tank 172 and providing for greater fuel charge when the line pressure falls and providing for lesser fuel charge to a fuel chamber in the injection valve such as 55 in the valve body as 52 above-described in relation to FIGURES 7, 8, and 9. Additionally, such control may also control the spring solenoid for air valve 153' and so regulate the weight of air admitted to the chamber 175 on each firing of the fuel therein thereby control the power output and the pressure in the line discharge 172. Additionally, a motor control 181 to control the speed r.p.m. of D.C. motor 156 may be provided to further control the power output if desired in relation to the pressure senses in air-supply tank 172.

The motor control and valve connections shown in the device of FIGURE 12 and the use of the turbine on the exhaust may be applied as desired to the device of FIGURE 1 and FIGURE 5.

A device for velocity perforating and fracturing according to this invention is shown in FIGURES 14 and 15. It comprises an air compressor assembly 21 and a timing and valve assembly 23 as in FIGURE 1 connected together with, in the casing 344, a fracturing assembly 343 to treat a formation as 370 as shown in FIGURE 14.

The fracturing assembly comprises a combustion chamber 352 operatively connected at its top with the valve 54 of assembly 23 and, its bottom, opening into a combustion tube, 351. The combustion chamber 352 is provided with an ignition system as 43, and spark plug, as 37, as in the apparatus of FIGURES 1–11.

Rotation of the rotary exhaust valve and the rotary injection valve by the driver therefor, as motor 46, to the orientation of such valves shown in FIGURE 3, followed by system 43 providing a spark across the gap of the spark plug as 37 ignites the fuel-air mixture in combustion chamber 352 and combustion tube 351 and forces the level of liquid therein down.

A differential piston 34 having a plunger 346 attached to the bottom thereof, is slidably located in said pump bell.

More specifically, the fracturing assembly according to this invention, also comprises an elongated cylindrical outer shell 346' which is, in turn, composed of a transmission section 347, a bell housing 348 and an extreme pressure pump barrel 349 and a side wall jet discharge section, 350. Within said shell 346' is the combustion tube 351 connected operatively at its upper end of a combustion chamber 352 and, its lower end, to a pump bell 353.

The piston 345 has attached thereto a plunger 346 as does piston 315, and the piston 345 moves upward and downward between its upper piston stop 358 and the lower piston stop 359. The pump bell 353 is an elongated hollow cylinder concentric with the longitudinal axis of the housing 348. The housing 348 is provided with a valve and partition plate 361 between the chamber 362 of the extreme pressure pump barrel 349 and the interior chamber 363 in the pump bell housing 348. A plurality of one-way valves, as 365 and 366, are located in seats therefor, as 365' and 366', respectively, therefor in the plate 361. The bottom of the pump bell is spaced away from the plate 361 sufficiently to allow fluid to pass from the interior of the pump bell 353 to the outside thereof and into the peripheral chamber 363 and to return freely therefrom. The pump plunger 346 is sufficiently long to reach from the bottom of the piston through the valve plate 361 when the piston 345 is adjacent to the upper piston stop 358. The length of the extreme pressure pump barrel is such that the pump plunger 346 reaches almost but not quite to the bottom of the chamber 362 when the differential piston is adjacent the bottom stop 359 in the pump bell 353.

The barrel 349 is built extremely sturdily to withstand the pressures applied thereto.

The extreme pressure pump barrel 349 has at its bottom a pair of diametrically opposed side-wall jets 350 and 350' and, above said jets, a one-way discharge ball valve 367 (ball 368 is resiliently fixed in position, as by spring 369, therefor) to provided for passage of fluid from chamber 362 in barrel 349 at extremely great pressures through said jets 350 and 350' to fracture the formation such as 370 where such jets contact it at points 371 and 372. Pressures of 800 p.s.i. to 2000 p.s.i. are provided to this sub-assembly at the floating piston 373 located in the combustion tube 351; as pressures are transmitted to a piston, as 345, of substantially larger area and result in a great multiplication (in proportion to the relative cross sectional areas of piston 345 and plunger 346) of the force applied by the plunger 346 and, accordingly, a 10- to 100-fold increase in pressure at the points 370 and 371, and even greater, as the diameter of the plunger 346 is reduced.

Accordingly, fluid forced outward of the chamber 362, on each 180° rotation of the rotary injection valve body 52 is driven into the formation 370. The following increment of fluid volume forced out of the chamber 362 drives the previously ejected fluid even deeper into the formation, as shown by the areas 375 and 376, 375 being the fluid ejected into the formation on a first half cycle of the valve 52; on the second half cycle of the fluid previously at position 376 is moved deeper into the formation, i.e., to the zone 375. Additionally, other fractures are made such as 377 in brittle formations due to the extreme pressures developed by this tool.

The movement of piston 345 shown in FIGURE 20 is effected by combustion of the fuel-air mixture in chamber 352 provided there (in the same manner as provided for combustion chamber 311 and 278 of application S.N. 93,110). Following ignition of the fuel-air mixture in the combustion chamber 352 and combustion tube 351 the rotary injection valve 45 moves to the position shown in FIGURES 4 and 7 above discussed. Thereupon, the reduction in pressure above the floating piston 373 results, as shown in FIGURE 15, that the injection fluid within the section 347 would pass through the peripheral housing chamber 363 and upward inside bell 353 against the piston 345 to move said piston upward toward and against the upper piston stop 358. This movement reduces the pressure in chamber 362 sufficiently to open valves 365 and 366. Fluid from chamber 363 then enters chamber 362 and replenishes the volume previously discharged from chamber 362 into the formation 370.

Injection fluid and propping agent 340 enters shell 346' for transmission to chamber 362, pressurization in that chamber and discharge therefrom into the to-be-fractured formation as above described.

Accordingly, chamber 362 would then be full with fluid and set for discharge of fluid through the valve 367 as above described on ignition of the fuel-air mixture in combustion chamber 352 and combustion tube 351 and repetition of the action above described for the device of FIGURE 14, and again drive high pressure fluid into formation 370.

The volume of fracturing fluid pumped into the formation is dependent on the rate of rotation of the valve body 52 in the timing and valve assembly 23 above described in some detail. In this system air compressor sub-assembly 21 and timing and valve sub-assembly 23, as above described, actuate the particular perforating and fracturing assembly hereinabove described. The above mentioned apparatus is freely movable up and down in the well and out of the well hole 344. The injection fluid may of course also have propping agent therein as shown in conventional procedures, such as U.S. Patents Nos. 2,699,212 and 2,337,295.

According to another embodiment of this invention shown in FIGURE 16 the combustion tube 381 is rotatably mounted on swivel bail 382, the outer shell 346' is dispensed with, and the well casing 344 is used to transmit the injection fluid and pumping agent down to where fracturing as 375', and 376' occurs as in the device of FIGURES 14 and 15. This apparatus differs from that shown in FIGURE 14 by the use of packers 385 whereby the device injection fluid and propping agent 387 are directed from the annular channel 388 into pump bell housing 386, thus allowing this apparatus to be raised, lowered and rotated as desired. The device of FIGURE 16 dispenses with one set of tubing which is an economic benefit.

In this device the combustion tube 381 is provided with a floating piston 384 which connected with the pump bell 383 as above described for the device of FIGURE 14. Within bell 383 are a piston 345' with a pump plunger 346' attached thereto, and stops as 358' and 359' all corresponding to similarly numbered components in the apparatus of FIGURE 14. The pump bell housing 386 in this case connects directly to the well casing 344 by the packer 385 whereby to transmit the injection fluid and propping agent 387 via the annular channel 388 about the combustion tube 381 into pump barrel 349'. Swivel bearing 391 allows the combustion tube 381 to rotate and accordingly rotate the extreme pressure pump barrel 349' to any position desired about the vertical axis. A mounting flange 389 supports the valve 44 on top of the swivel housing 390 and combustion tube 381 is also supported from such housing on swivel bearings 391. Otherwise, the structure and operation are the same as above described for FIGURES 14 and 15.

Reed valves 505 as shown in FIGURES 13 are used in the preferred embodiments of the compressor subassembly 21 of the assemblies hereinabove disclosed. Such reed valve is used in line between the compressor valve outlet to valve 28 and chamber 29 in the embodiment of FIGURES 1 through 11 in place of the check valve generally shown as 28 and positioned in dotted lines in FIGURE 4 and as shown in dotted line at 505' in line 151 of the embodiment of FIGURE 12 in place of valve 150 or in place of valve 172' of FIGURE 12. Such reed valves may be used in parallel or in larger size where greater capacities are desired.

Such reed valve comprises an elongated cylindrical outer shell 506, 6 inches internal diameter, closed at one end 507 and open at its opposite inlet end 508. An exit tube 510, elongated and cylindrical in shape is located internal of tube shell 506 and coaxial therewith; it is 4 inches internal diameter, closed at one end, 511 and open at its exit orifice 512 and provided with a plurality of ⅛ inch diameter perforations as 513, 513' 513" (providing a total perforation area 3 times the area of orifice 512) as air inlet holes; these holes are spaced ⅜ inch center to center and arranged in parallel lines behind the equispaced reed valve fingers, as 515, 516, 517, 518, 519, 520 and 521, each six inches long and ³⁄₁₆ inch wide and elastically held in place by a head ring 522. The valve fingers are separated from one another by ⅛ inch grooves and made of thin flexible stainless steel and extend over and in direct contact with the orifices of the valve perforations as 513, 513', etc., to the interior of tube 510. Tube 510 has a taper of .06" per foot to slightly compress the fingers at their lower end. Such valves provide substantially greater air inlet area than the ball valves shown, for purposes of simplicity, as illustrative of conventional check valves which may be used. The valve housing 506 may be replaced by an air filter for use of these reed valves as an inlet check valve; then such modified reed valve would substitute for inlet check valves 27 of FIGURES 1 through 11 and inlet check valve 167 and 166" of FIGURE 12.

As many possible embodiments may be made of the invention without departing from the scope thereof, it is to be understood that all matter herein set forth or shown in the accompanying drawings is to be interpreted as illustrative and not in a limiting sense.

We claim:
1. Apparatus for pumping fluid and adapted to fracture an underground formation comprising a combustion chamber with an inlet for air and an inlet for fuel and a gas discharge outlet near the top thereof, valve means in each of said inlets and outlet for opening and closing each of said inlets and outlet, an air compressor and gas compressing means in said air compressor and air compressor discharge means operatively connected to said compressor, said air compressor discharge means opening through an opening and closing valve means to an air reservoir tank, said tank opening through an opening and closing valve means to said inlet for air and through a valve means to said inlet for fuel and the gas discharge outlet of said combustion chamber operatively connected through an opening and closing valve means to said gas compressing means within said gas compressor, said apparatus being adapted to fracture an underground formation wherein said air compressor and valve means and timing mechanism therefor are above the ground, and wherein the combustion chamber comprises a first vertically elongated tube and said tube is operatively connected to a first bell-shaped chamber which chamber has an opening at its lower end and has a greater horizontal cross-section area than said tube, a piston slidably fitting in said first chamber, a plunger of less diameter than said piston attached to said piston and projecting through and below said opening, a second chamber surrounding said opening and having a bottom valve plate below said opening, a second tube connecting said second chamber to the surface, a fluid reservoir at the surface operatively connected to said second tube said plunger slidably fitting into and passing through said bottom valve plate, the interior of said second chamber being separated by said bottom valve plate from a third chamber therebelow, and said plunger extending into said third chamber, said bottom valve plate having therein a one-way valve permitting flow of liquid from said second chamber into said third chamber, said third chamber having oppositely directed jets opening from the interior to the periphery of said chamber, said jets being adjacent said underground formation.

2. A device as in claim 1, wherein there is a column of liquid in said first vertical elongated tube and said first bell-shaped chamber, said column resting on said piston, and a floating piston is positioned in said first tube on the top of said column.

3. A device as in claim 1, wherein said first vertically elongated tube is rotatable, said second chamber has walls which are firmly fixed to said first tube, and the third chamber is firmly fixed to the second chamber.

References Cited
UNITED STATES PATENTS

| 2,866,509 | 12/1958 | Brandon | 166—177 |
| 2,915,122 | 12/1959 | Hulse | 166—177 X |
| 3,133,591 | 5/1964 | Brandon | 166—177 X |
| 3,193,014 | 7/1965 | Hill | 166—177 X |

CHARLES E. O'CONNELL, *Primary Examiner.*

D. H. BROWN, *Assistant Examiner.*